(12) United States Patent
Ostertag et al.

(10) Patent No.: US 11,535,088 B2
(45) Date of Patent: Dec. 27, 2022

(54) MOTOR VEHICLE FRONT SECTION

(71) Applicant: Dr. Ing. h.c. F. Porsche Aktiengesellschaft, Stuttgart (DE)

(72) Inventors: Jasmin Ostertag, Stuttgart (DE); Erwin Goetz, Weil der Stadt (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 278 days.

(21) Appl. No.: 16/907,332

(22) Filed: Jun. 22, 2020

(65) Prior Publication Data

US 2020/0406715 A1 Dec. 31, 2020

(30) Foreign Application Priority Data

Jun. 27, 2019 (DE) ...................... 10 2019 117 360.4

(51) Int. Cl.
| | |
|---|---|
| *B60H 1/28* | (2006.01) |
| *B62D 25/08* | (2006.01) |
| *B62D 25/12* | (2006.01) |
| *B60H 1/00* | (2006.01) |
| *B62D 25/10* | (2006.01) |
| *B60H 1/26* | (2006.01) |

(52) U.S. Cl.
CPC ............. *B60H 1/28* (2013.01); *B62D 25/085* (2013.01); *B62D 25/12* (2013.01); *B60H 1/267* (2013.01); *B60H 2001/00085* (2013.01); *B62D 25/081* (2013.01); *B62D 25/105* (2013.01)

(58) Field of Classification Search
CPC ............ B60H 1/28; B60H 2001/00085; B60H 1/267; B62D 25/085; B62D 25/12; B62D 25/105; B62D 25/081
USPC .......................................................... 454/146
See application file for complete search history.

(56) References Cited

U.S. PATENT DOCUMENTS

| | | | |
|---|---|---|---|
| 4,982,993 A | 1/1991 | Okazaki et al. | |
| 5,782,312 A * | 7/1998 | Murakawa ............. | B60K 11/08 D15/15 |
| 6,837,324 B2 * | 1/2005 | Nagai .................... | B60K 11/08 180/68.3 |
| 11,077,738 B2 | 8/2021 | Czechtizky | |

FOREIGN PATENT DOCUMENTS

| | | |
|---|---|---|
| CN | 109774425 A | 5/2019 |
| DE | 41 31 597 A1 | 4/1993 |
| DE | 101 15 266 A1 | 10/2001 |

(Continued)

*Primary Examiner* — D Glenn Dayoan
*Assistant Examiner* — Dana D Ivey
(74) *Attorney, Agent, or Firm* — Leydig, Voit & Mayer, Ltd.

(57) ABSTRACT

A motor vehicle front section of a motor vehicle includes a first spatial region, a second spatial region formed separately from the first spatial region, a first cover that covers the first spatial region, and a second cover that covers the second spatial region. The first cover extends substantially over a width of the motor vehicle front section, and the second cover extends substantially over the width of the motor vehicle front section. The first cover is arranged in front of or behind the second cover in a vehicle longitudinal direction. An access is provided in at least one of the covers for at least one connection arranged underneath the cover.

20 Claims, 5 Drawing Sheets

(56) References Cited

FOREIGN PATENT DOCUMENTS

| | | |
|---|---|---|
| DE | 103 36 847 A1 | 3/2005 |
| EP | 1 065 136 A2 | 1/2001 |
| EP | 1065136 A2 * | 1/2001 ............. B62D 21/16 |
| FR | 2698334 A1 | 5/1994 |
| FR | 2 771 980 A1 | 6/1999 |
| FR | 2 943 303 A1 | 9/2010 |
| JP | 2001301660 A | 10/2001 |

* cited by examiner

MOTOR VEHICLE FRONT SECTION

CROSS REFERENCE TO RELATED APPLICATIONS

This application claims benefit to German Patent Application No. DE 10 2019 117 360.4, filed Jun. 27, 2019, which is incorporated by reference herein.

FIELD

The invention relates to a motor vehicle front section of a motor vehicle.

BACKGROUND

In motor vehicles, it is known that the front section is formed with a hood or cover spanning substantially the entire front section. In motor vehicles with the internal combustion engine in the motor vehicle front section, the engine hood spans the entire front section and covers the engine compartment. Also known are motor vehicles with a rear-mounted engine or mid-engine, in which, in addition to technical units or fluid storage containers, a luggage compartment is also provided in the motor vehicle front section, wherein the cover of the motor vehicle front section covers the entire front section.

The cover of the motor vehicle front section is so large that it covers the entire front section. As a result, the entire cover has to be lifted in order, for example, to top up coolant or windshield washer fluid or to accommodate or remove luggage. Such a large cover is therefore also heavy and costly, in particular also with regard to the requirements of accident and pedestrian protection, it being entirely possible for costly active systems for raising the cover also to be necessary

SUMMARY

In an embodiment, the present invention provides a motor vehicle front section of a motor vehicle. The motor vehicle front section includes a first spatial region, a second spatial region formed separately from the first spatial region, a first cover that covers the first spatial region, and a second cover that covers the second spatial region. The first cover extends substantially over a width of the motor vehicle front section, and the second cover extends substantially over the width of the motor vehicle front section. The first cover is arranged in front of or behind the second cover in a vehicle longitudinal direction. An access is provided in at least one of the covers for at least one connection arranged underneath the cover.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
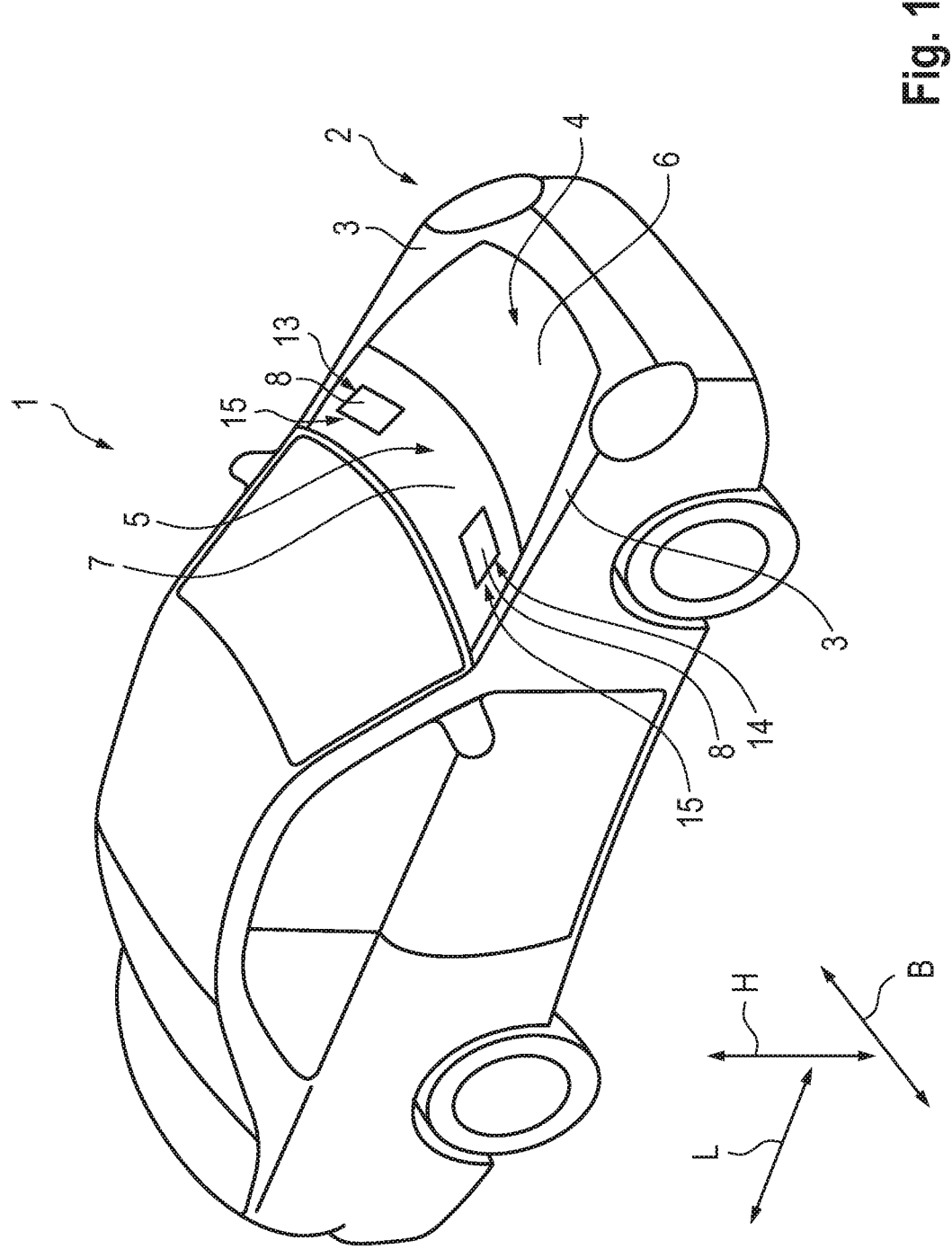
FIG. 1 is a perspective illustration of a motor vehicle having a motor vehicle front section.

The present disclosure describes motor vehicle front sections which are improved as compared with the prior art and make possible rapid access to predefined connections or units.

An exemplary embodiment relates to a motor vehicle front section of a motor vehicle having a first spatial region and having a second spatial region, which are formed separately from each other, wherein a first cover is provided, which covers the first spatial region, and a second cover is provided, which covers the second spatial region, wherein the first cover extends substantially over the width of the motor vehicle front section, and the second cover extends substantially over the width of the motor vehicle front section, wherein the first cover is arranged in front of or behind the second cover in the vehicle longitudinal direction, and wherein a possible access is provided in at least one of the covers for at least one connection arranged underneath the cover. As a result, even when the cover is closed, at least one connection arranged underneath the cover can be operated or used, such as, for example, an electrical connection, in particular for charging the battery, a supply connection for coolant or windshield washer fluid for topping up a correspondingly provided storage container, an air supply connection as ventilation connection and/or venting connection. As a result, the cover can be configured in such a way that it does not have to be opened during each access to the connection, but instead, for example, only in the event of service in the workshop or during a repair, wherein then, even with the cover closed, it is possible to charge, ventilate, vent and/or top up, etc. This also makes it easier to handle the motor vehicle.

It is also particularly advantageous if the first spatial region is a spatial region that is accessible from above after the first cover has been opened and/or the second spatial region is a spatial region that is accessible from above after the second cover has been opened. Here, accessibility available from above does not automatically mean that the spatial region is open at the top. It can be open at the top but does not also have to be.

It is particularly advantageous if the first spatial region is a luggage compartment and/or the second spatial region is a technical compartment. The luggage compartment can be, for example, a luggage compartment trough which is open at the top. The technical compartment can be a spatial region which has at least one connection or connections such as, for example, an electrical connection, in particular for charging a battery, a supply connection for coolant or windshield washer fluid for topping up an appropriately provided storage container, an air supply connection as ventilation connection and/or a vent connection.

It is particularly advantageous if at least one of the covers, in particular the second cover, is fixed detachably by means of retaining elements and in particular is pivotably and/or removably supported. By means of the removable cover, the latter can be operated simply during service, and complicated hinges are dispensed with.

It is also advantageous if at least one predefined connection and/or at least one predefined unit is/are provided under at least one of the covers, in particular under the second cover, wherein at least one openable and re-closable access opening and/or at least one permanently open access opening is/are provided in the corresponding cover, such as for example in the second cover, in order to supply or to use the at least one connection and/or the at least one unit. As a result, the connection or the unit is accessible for an access without the corresponding cover having to be opened. This makes handling easier.

It is also advantageous if a plurality of predefined connections and/or predefined units is provided under one of the covers, in particular under the second cover, wherein a plurality of openable and re-closable access openings and/or permanently open access openings is provided in the corresponding cover. As a result, the connections and units provided are accessible for an access without the corresponding cover having to be open. This makes handling easier.

It is also advantageous if the number of access openings are divided into functional islands distributed on the cover. As a result, grouping of the access openings for the connections and/or units is achieved, so that improved operability and utilisation of space can be achieved.

It is also advantageous if a functional island can have one access opening or a plurality of access openings. The distribution of the access openings on the connections or units is made easier thereby.

It is also preferred for a functional island to be provided which has at least two access openings, wherein a closure device is provided, by means of which each of the at least two access open is accessible only when the respective other access opening or the respective other access openings is or are closed. Thereby, the situation can be achieved in which, for example when putting a fluid into a connection, the fluid does not accidentally get into an adjacent connection.

It is advantageous if the closure device has a slider or a flap or the like, which makes each of the at least two access openings accessible in such a way that it closes the respective other access opening or the respective other access openings. Thereby, it is possible to achieve the situation in which, for example when putting a fluid into a connection, the fluid does not accidentally get into an adjacent connection.

It is also advantageous if a functional island is provided which has at least two access openings, wherein the at least two access openings are configured to be permanently open. Such a configuration is, for example, advantageous in the event of an adjacent arrangement of a ventilation opening and a vent opening in one functional island.

In one exemplary embodiment, it is advantageous if one of the access openings is provided to supply air for the vehicle interior, in particular for air-conditioning the vehicle interior.

It is also advantageous if one of the access openings is provided to supply and/or extract air for the ventilation and/or venting of a unit of the motor vehicle.

It is particularly advantageous if one of the access openings is provided to supply air for cooling or controlling the temperature of the unit.

In particular, the disclosure also relates to a motor vehicle having such a motor vehicle front section.

FIG. 1 shows a motor vehicle 1 having a motor vehicle front section 2. Between the two wings 3 and between the two wheel housings there are provided two spatial regions 4, 5, which are arranged and formed under two covers 6, 7.

The motor vehicle front section 2 is provided with a first spatial region 4 and with a second spatial region 5, which are formed separately from each other. In FIG. 1, the first spatial region 4 is arranged in front of the second spatial region 5 in the vehicle longitudinal direction L.

For example, the first spatial region 4 is a luggage compartment and/or the second spatial region 5 is a technical compartment. The luggage compartment is in particular a luggage compartment trough or the like open at the top. The technical compartment can be a spatial region open at the top, in which technical units, elements of a fluid supply, a control unit, a battery etc. can be arranged. The technical compartment can also be closed at the top, wherein connections and/or units can be accessible for example for putting in a fluid such as cooling water, oil, windshield washer fluid, for ventilation, for venting, for electrical supply, for charging and/or for data connection, etc.

The first spatial region 4 is a spatial region that is accessible from above after the first cover 6 has been opened and/or the second spatial region 5 is optionally a spatial region that is accessible from above after the second cover 7 has been opened. However, it is also possible for only the units which have to be supplied, operated, filled, monitored, etc. to be accessible.

Thus, a first cover 6 is provided, which covers the first spatial region 4, in particular in a closed position of the first cover 6. Furthermore, a second cover 7 is provided, which covers the second spatial region 5, in particular in a closed position of the second cover 7.

The first cover 6 extends substantially over the width of the motor vehicle front section 2. As can be seen, the first cover 6 extends between the two wings 3, the course of which becomes wider toward the front. The second cover 7 also extends substantially over the width of the motor vehicle front section 2, wherein, as can be seen, the second cover 7 also extends between the two wings 3, the course of which becomes wider toward the front. The two covers 6, 7 therefore do not necessarily extend over the complete width of the motor vehicle front section 2.

The second cover 7 can be arranged to be offset vertically with respect to the first cover 6, or the second cover 7 can form a quasi-continuous surface continuously with the first cover 6. In the case of an optional vertical offset, an offset can be provided between a rear edge and/or a rear region of the first cover 6 and a front edge and/or a front region of the second cover 7. For the purpose of ventilating and/or venting the second spatial region 5, at least one ventilating opening, in particular a ventilating grille or the like, can then be provided, for example in the region of the offset.

However, it can be seen in FIG. 1 that the second cover 7 is not arranged to be offset vertically with respect to the first cover 6, but instead the first cover 6 merges with its course approximately continuously into the second cover 7. Both covers 6, 7 are arranged rising somewhat obliquely.

It is particularly advantageous if the first cover 6 is formed so as to be pivotably supported and is pivotable between a first closed position of the first cover 6, see FIG. 1, and an open second position of the first cover 6.

It is advantageous if the first cover 6 is formed to be pivotably supported by means of a hinge or hinges or a link arrangement, wherein the pivot axis of the first cover 6 is arranged in a front region of the first cover 6 or in a rear region of the first cover 6, so that the first cover 6 opens at the rear or opens at the front. If the first cover 6 opens at the front, the luggage compartment is easily accessible. Alternatively, the first cover 6 can also open at the rear.

It is also advantageous if the second cover 7 is pivotably supported and pivotable between a first closed position of the second cover 7, see FIG. 1, and an open second position of the second cover 7. It is advantageous if the second cover 7 is pivotably supported by means of a hinge or hinges or a link arrangement wherein the pivot axis of the second cover 7 can be arranged in a front region of the second cover 7 or in a rear region of the second cover 7, so that the second cover 7 either opens at the rear or opens at the front.

Alternatively or additionally, the second cover 7 can be fixed detachably by means of retaining elements and in particular be pivotably and/or removably supported. Given such a solution, it is expedient if the second cover 7 does not have to be opened continually but only at relatively long intervals, for example during maintenance, etc.

Figure 2:
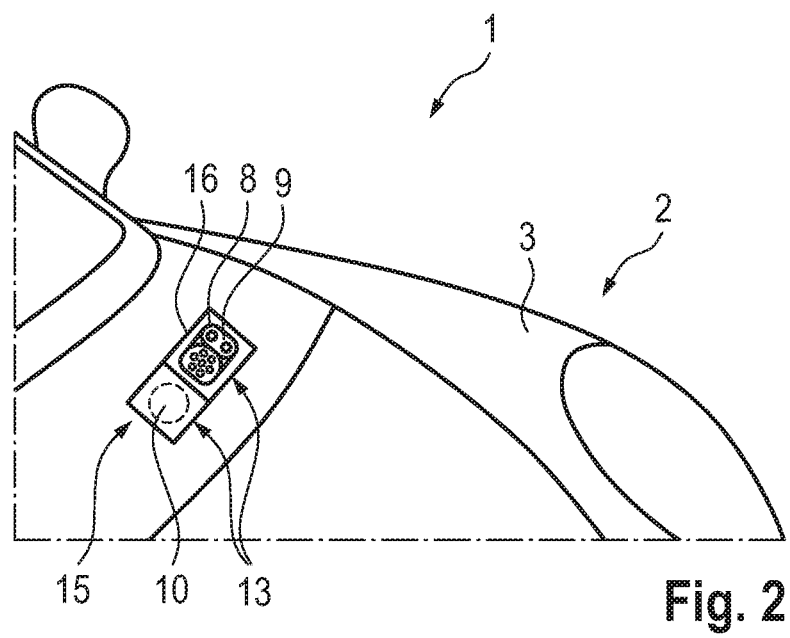
FIG. 2 is a perspective partial illustration of a motor vehicle front section.
Figure 7:
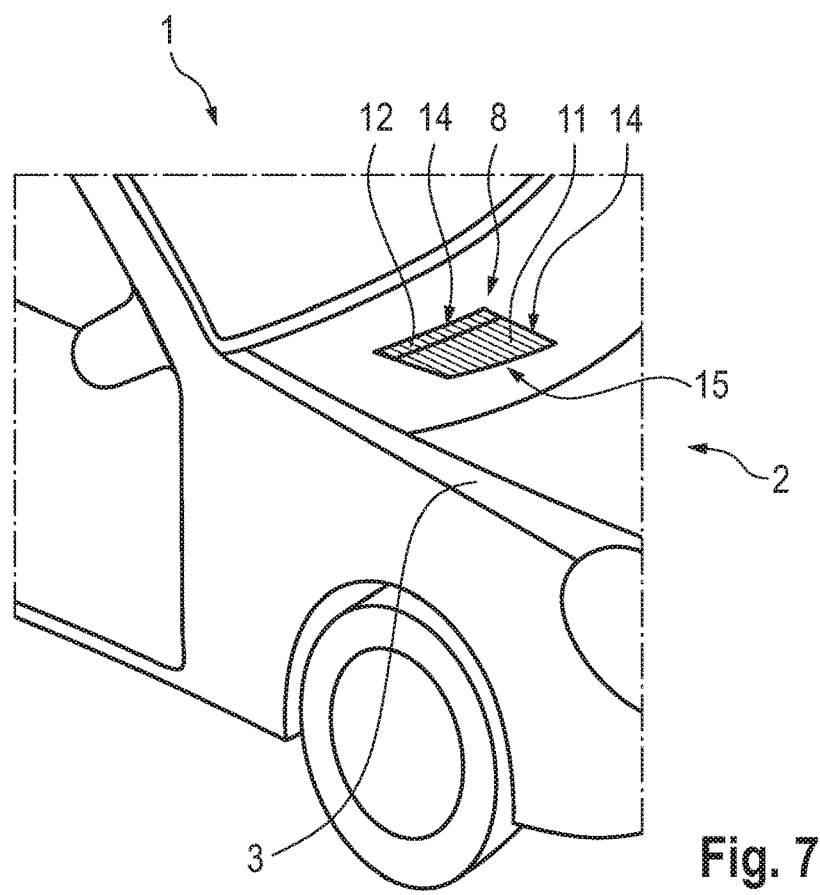
FIG. 7 is a further perspective partial illustration of a motor vehicle front section.

According to the disclosure, a possible access 8 is provided in at least one of the covers 6, 7, such as in particular in the cover 7, see FIG. 1, 2 or 7, for at least one connection 9, 10, 11, 12 arranged underneath the cover 6, 7.

In a corresponding way, at least one predefined connection 9, 10, 11, 12 and/or at least one predefined unit is or are provided under at least one of the covers 6, 7, see FIGS. 1, 2 and 7, in particular under the second cover 7, wherein at least one openable and re-closable access opening 13 and/or at least one permanently open access opening 14 is provided in the corresponding cover 6, 7, in order to supply or to use the at least one connection 9, 10, 11, 12 and/or the at least one unit. Preferably, a plurality of predefined connections 9, 10, 11, 12 and/or predefined units is provided under one of the covers 6, 7, in particular under the second cover 7, wherein a plurality of openable and re-closable access openings 13 and/or permanently open access openings 14 is provided in the corresponding cover 6, 7.

FIGS. 1, 2 and 7 show that the access openings 13 and 14 are distributed to so-called functional islands 15, so that the access openings 13, 14 and the corresponding connections 9, 10, 11, 12 and units are arranged accordingly, in particular arranged in groups of a functional island 15.

The number of access openings 13, 14 are divided into functional units 15 distributed on the cover 7, in order to achieve structuring of the connections 9, 10, 11, 12 and, accordingly, the access openings 13, 14. It is also advantageous if a functional island 15 has one access opening 13, 14 or a plurality of access openings 13, 14. In a corresponding way, given a plurality of such functional islands 15, the arrangement of the connections 9, 10, 11, 12 and of the access openings 13, 14 can be structured.

FIGS. 2 and 7 show that the two functional islands 15 are provided in such a way that they have at least two access openings 13, 14.

The functional island 15 shown in FIG. 2, with its two access openings 13, also has a closure device 16 which, in FIGS. 3 to 6, will be explained in more detail by using a schematic example.

The closure device 16 is formed in such a way that each of the at least two access openings 13 is accessible only when the respective other access opening 13 or the respective other access openings 13 is or are closed. Such an access opening 13 is equivalent to one access opening.

Figure 3:
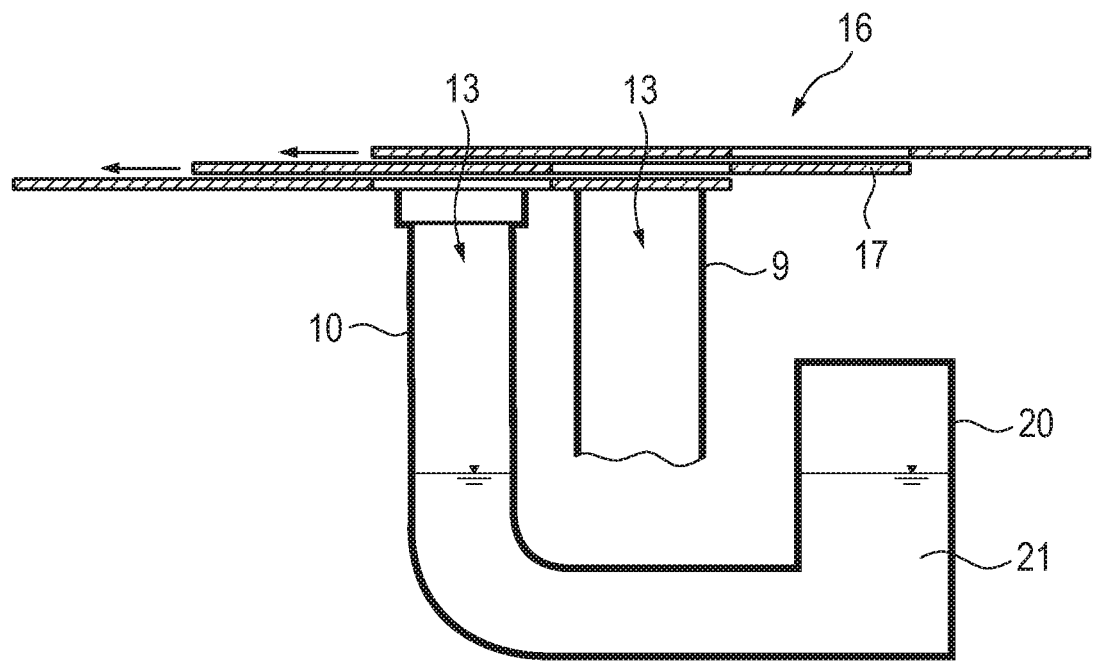
FIG. 3 is a schematic partial sectional illustration of a connection situation of two connections.

FIG. 3 shows two access openings 13, which lead to connections 9, 10. The connection 10 is a fluid connection, for example for wiping and/or spraying water, downstream of which a reservoir 20 for storing the fluid 21 is arranged. The connection 9 is an electrical connection, in particular for charging an electric energy store, such as for example a battery.

The closure device 16 has a slider 17, which is displaceably formed over the access openings 13 of the connections. The slider 17 has an opening 18 and closed regions 19.

Figure 4:
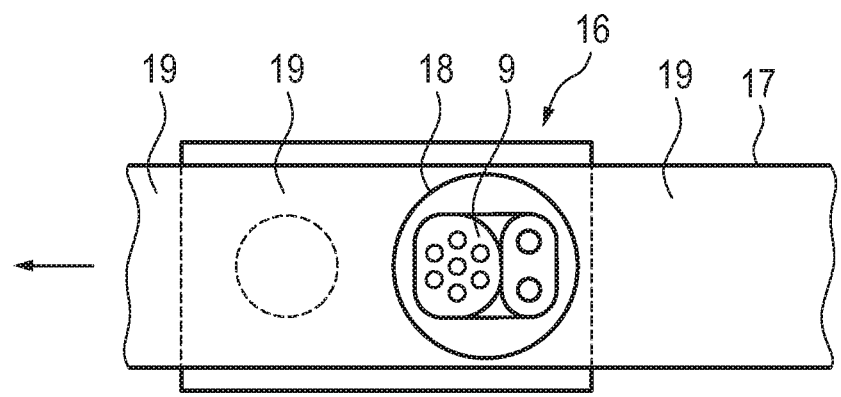
FIG. 4 is a schematic view of two connections, the open state of which is controllable by means of a slider as a closure device, a right-hand connection being exposed.

FIG. 4 reveals that the opening 18 is arranged in the region of the connection 9, and a closed region 19 is arranged over the connection 10. Therefore, the electrical connection 9 is exposed and the fluid connection 10 is closed in a sealed manner. It is therefore possible for a plug to be plugged into the electrical connection 9.

Figure 5:
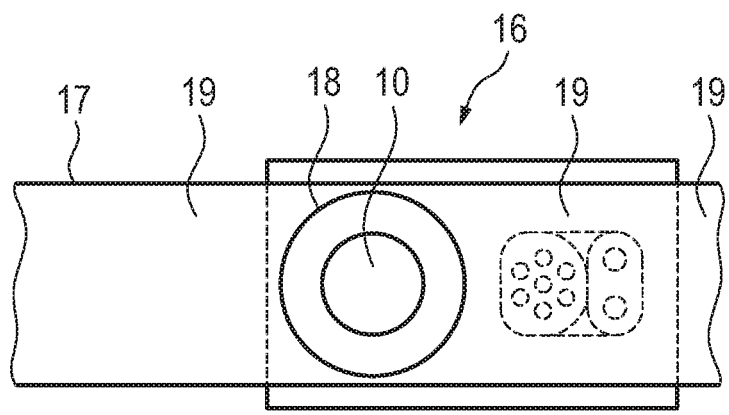
FIG. 5 is a schematic view of two connections, the open state of which is controllable by means of a slider as a closure device, a left-hand connection being exposed.

FIG. 5 reveals that the opening 18 is arranged in the region of the connection 10, and a closed region 19 is arranged over the connection 9. Therefore, the fluid connection 10 is exposed and the electrical connection 9 is closed in a sealed manner. It is therefore possible for a fluid to be put into the fluid connection 10.

There is expediently also a slider position in which both connections 9, 10 are closed.

Figure 6:
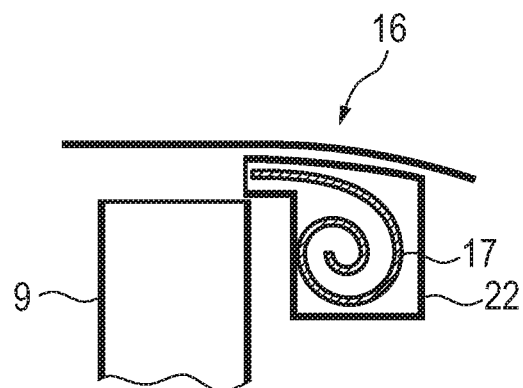
FIG. 6 is a sectional illustration of the closure device with slider.

FIG. 6 shows a section through the closure device 16 having the slider 17. It can be seen that the slider 17 is flexible and partly rolled up, in order to be able to be accommodated in a receptacle 22 in a rolled-up manner. Overall space can therefore be saved. In addition, the slider 17 either has a handle for the manual displacement of the slider 17 or a drive for the automated displacement of the slider 17.

Instead of the slider 17, a flap or the like can also be used.

Figure 8:
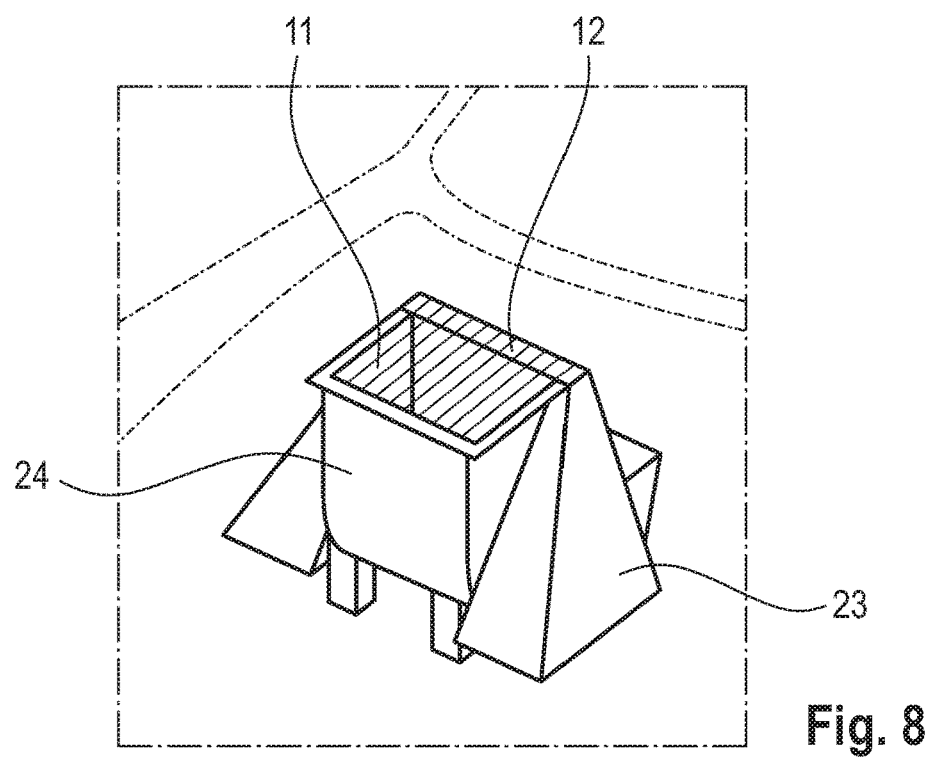
FIG. 8 is a perspective illustration of two connections.
Figure 9:
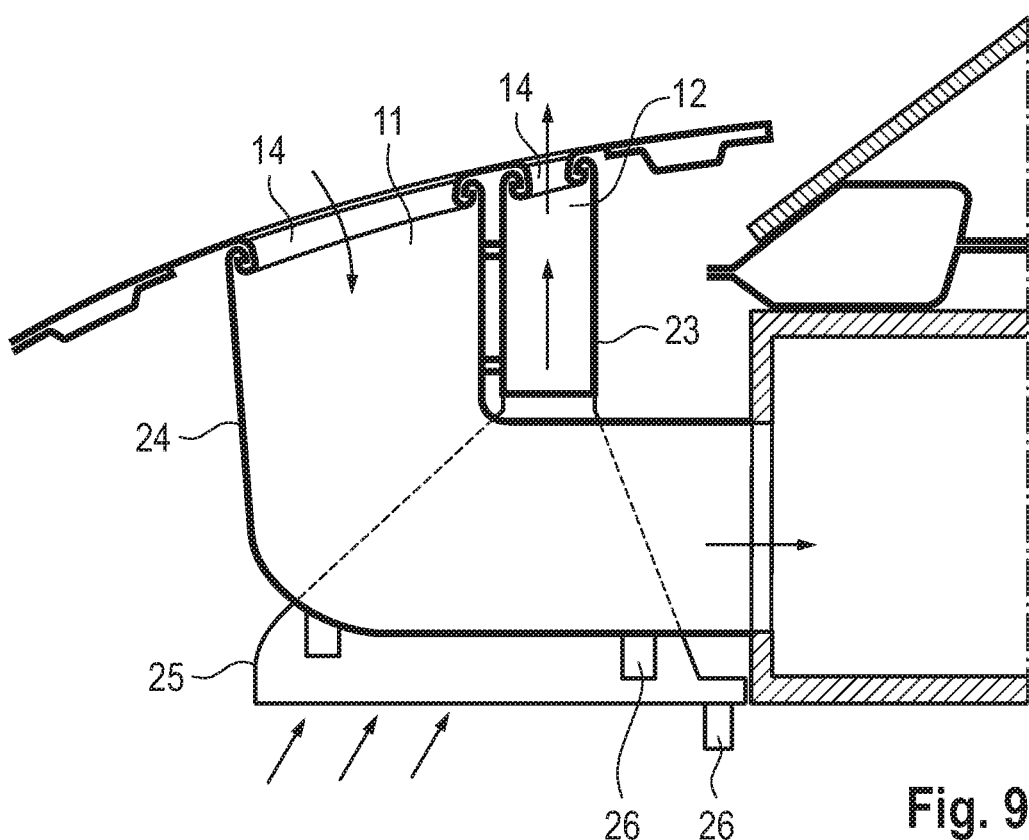
FIG. 9 is a schematic partial sectional illustration of the two connections of FIG. 8.

FIGS. 8 and 9 show the arrangement of air ducts 23, 24, which are provided under the two connections 11, 12 for air supply and for air extraction, so that they can be used for ventilating and venting. The access openings 14 are closed in a permeable manner, for example by an air grille. The inlet air can be air for the motor vehicle interior and/or for cooling a unit. The air ducts 25 shown in FIG. 9 also have, for example, water drainage openings 26. In a corresponding way, it is advantageous if one of the access openings 14 is provided to supply air for the vehicle interior, in particular for the air conditioning of the vehicle interior. As a result, fresh air can be supplied to an air conditioning unit. It is also expedient if one of the access openings 14 is provided to supply and/or extract air for the ventilation and/or venting of a unit of the motor vehicle, wherein in particular one of the access openings 14 is provided to supply air for cooling or controlling the temperature of the unit.

At least one functional island 15 which has at least two access openings 14 is therefore provided, the at least two access openings 14 being configured to be permanently open.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Motor vehicle
2 Motor vehicle front section
3 Wing
4 First spatial region
5 Second spatial region
6 First cover
7 Second cover
8 Possible access
9 Connection/electrical connection
10 Connection/fluid connection
11 Connection/air connection
12 Connection/air connection
13 Access opening
14 Access opening
15 Functional island
16 Closure device
17 Slider
18 Opening
19 Region
20 Reservoir
21 Fluid
22 Receptacle
23 Air duct
24 Air duct
25 Air duct
26 Water drainage opening

What is claimed is:

1. A motor vehicle front section of a motor vehicle, comprising:
    a first cover that extends over a width of the motor vehicle front section and that covers a first spatial region;
    a second cover that extends over a width of the motor vehicle front section and that covers a second spatial region, the second spatial region formed separately from the first spatial region; and
    a plurality of connections disposed beneath at least one access opening in at least one of the first cover or the second cover; and
    a closure device configured to prevent access to all of the plurality of connections and to selectively enable access to one or more connections of the plurality of connections while preventing access to one or more other connections of the plurality of connections,
    wherein the first cover is arranged in front of or behind the second cover in a vehicle longitudinal direction.

2. The motor vehicle front section as claimed in claim 1, wherein the first spatial region is a spatial region that is accessible from above after the first cover has been opened and/or the second spatial region is a spatial region that is accessible from above after the second cover has been opened.

3. The motor vehicle front section as claimed in claim 1, wherein the first spatial region is a luggage compartment and/or the second spatial region is a technical compartment.

4. The motor vehicle front section as claimed in claim 1, wherein the second cover is fixed detachably by retaining elements.

5. The motor vehicle front section as claimed in claim 1, wherein the plurality of connections includes an electrical connection and a fluid connection, and wherein the closure device is configured to prevent access to both the electrical connection and the fluid connection and to enable access to one of the electrical connection or the fluid connection while preventing access to the other of the electrical connection and the fluid connection.

6. The motor vehicle front section as claimed in claim 1, wherein a plurality of openable and re-closable access openings and/or permanently open access openings are provided in at least one of the first cover or the second cover.

7. The motor vehicle front section as claimed in claim 6, wherein the plurality of access openings are divided into functional islands distributed on the cover.

8. The motor vehicle front section as claimed in claim 7, wherein a functional island has one access opening or a plurality of access openings.

9. The motor vehicle front section as claimed in claim 7, wherein a functional island is provided which has at least two access openings, wherein the at least two access openings are configured to be permanently open.

10. The motor vehicle front section as claimed in claim 9, wherein one of the at least two access openings is configured to supply air for the vehicle interior.

11. The motor vehicle front section as claimed in claim 9, wherein one of the at least two access openings is configured to supply and/or extract air for the ventilation and/or venting of a unit of the motor vehicle.

12. The motor vehicle front section as claimed in claim 11, wherein one of the at least two access openings is provided to supply air for cooling or controlling the temperature of the unit.

13. The motor vehicle front section as claimed in claim 1, wherein the plurality of connections disposed beneath the at least one access opening in at least one of the first cover or the second cover are disposed beneath at least two access openings in the first cover or the second cover, wherein the at least two access openings are provided in a single functional island, wherein the closure device is configured to close all or all but one of the at least two access openings.

14. The motor vehicle front section as claimed in claim 13, wherein the closure device has a slider or a flap that makes each of the at least two access openings accessible in such a way that it closes the respective other access opening or the respective other access openings.

15. A motor vehicle front section of a motor vehicle, comprising:
    a first spatial region;
    a second spatial region formed separately from the first spatial region;
    a first cover that covers the first spatial region; and
    a second cover that covers the second spatial region;
    wherein the first cover extends substantially over a width of the motor vehicle front section,
    wherein the second cover extends substantially over the width of the motor vehicle front section, wherein the first cover is arranged in front of or behind the second cover in a vehicle longitudinal direction, wherein an access is provided in at least one of the covers for at least one connection arranged underneath the cover, wherein a plurality of predefined connections and/or predefined units is provided under one of the covers, wherein a plurality of openable and re-closable access openings and/or permanently open access openings are provided in the corresponding cover, wherein the plurality of access openings are divided into functional islands distributed on the cover, and wherein a functional island is provided which has at least two access openings, wherein a closure device is provided, by way of which each of the at least two access openings is accessible only when the respective other access opening or the respective other access openings is or are closed.

16. The motor vehicle front section as claimed in claim 15, wherein the closure device has a slider or a flap or the like, which makes each of the at least two access openings accessible in such a way that it closes the respective other access opening or the respective other access openings.

17. The motor vehicle front section as claimed in claim 15, wherein one of the at least two access openings is configured to supply air for the vehicle interior or to supply and/or extract air for the ventilation and/or venting of a unit of the motor vehicle.

18. The motor vehicle front section as claimed in claim 15, wherein one of the at least two access openings is provided to supply air for cooling or controlling the temperature of the unit.

19. The motor vehicle front section as claimed in claim 15, wherein the first spatial region is a spatial region that is accessible from above after the first cover has been opened and/or the second spatial region is a spatial region that is accessible from above after the second cover has been opened.

20. The motor vehicle front section as claimed in claim 15, wherein the first spatial region is a luggage compartment and/or the second spatial region is a technical compartment.

* * * * *